United States Patent
White et al.

(10) Patent No.: US 9,626,103 B2
(45) Date of Patent: Apr. 18, 2017

(54) SYSTEMS AND METHODS FOR IDENTIFYING MEDIA PORTIONS OF INTEREST

(71) Applicant: BrightSky Labs, Inc., Mountain View, CA (US)

(72) Inventors: Sean M. White, Mountain View, CA (US); Christopher Beard, San Jose, CA (US); Ian McCarthy, Menlo Park, CA (US); Ann-Caryn Cleveland, Pacifica, CA (US)

(73) Assignee: BrightSky Labs, Inc., Mountain View, CA (US)

( * ) Notice: Subject to any disclaimer, the term of this patent is extended or adjusted under 35 U.S.C. 154(b) by 0 days.

(21) Appl. No.: 14/735,992

(22) Filed: Jun. 10, 2015

(65) Prior Publication Data

US 2015/0373281 A1    Dec. 24, 2015

Related U.S. Application Data

(60) Provisional application No. 62/131,455, filed on Mar. 11, 2015, provisional application No. 62/047,553, filed on Sep. 8, 2014, provisional application No. 62/014,203, filed on Jun. 19, 2014.

(51) Int. Cl.
*H04H 60/33* (2008.01)
*G06F 3/0488* (2013.01)
(Continued)

(52) U.S. Cl.
CPC ........ *G06F 3/04883* (2013.01); *G06F 3/0482* (2013.01); *G06F 3/0486* (2013.01);
(Continued)

(58) Field of Classification Search
CPC ............ H04N 21/845; H04N 21/8549; H04N 21/23418; H04N 21/422; H04N 21/42201; H04N 21/42202
See application file for complete search history.

(56) References Cited

U.S. PATENT DOCUMENTS 6,052,492 A * 4/2000 Bruckhaus ........... G11B 27/034 382/284
6,321,179 B1 * 11/2001 Glance .................. G06Q 30/02 702/189

(Continued)

*Primary Examiner* — Pankaj Kumar
*Assistant Examiner* — Timothy Newlin
(74) *Attorney, Agent, or Firm* — Goodwin Procter LLP

(57) ABSTRACT

Systems and methods for video editing and playback are provided. In one implementation, a selected portion of a timeline for navigating media content can be repositioned and resized by user input actions received along various axes relative to the timeline. In another implementation, a plurality of signals associated with media content can be intelligently weighted based on user group historical attributes to identify portions of interest in the media content. In a further implementation, an experience map for media content is provided in which a representative signature for the content includes visual signal intensity representations and social interest concentrations over the length of the content. In another implementation, a subset of filters is determined for recommendation to a user based on one or more attributes associated with at least one of media content, the user, a group of users, or a user device.

24 Claims, 13 Drawing Sheets

(51) Int. Cl.
*G06F 3/0484* (2013.01)
*G06F 17/30* (2006.01)
*G06F 3/0486* (2013.01)
*G11B 27/034* (2006.01)
*G11B 27/34* (2006.01)
*G06F 3/0482* (2013.01)
*H04L 29/06* (2006.01)
*G11B 27/00* (2006.01)
*G11B 27/031* (2006.01)
*G11B 27/10* (2006.01)
*H04N 5/265* (2006.01)

(52) U.S. Cl.
CPC ...... *G06F 3/04842* (2013.01); *G06F 3/04845* (2013.01); *G06F 3/04847* (2013.01); *G06F 17/3005* (2013.01); *G06F 17/30029* (2013.01); *G06F 17/30064* (2013.01); *G06F 17/3082* (2013.01); *G06F 17/30867* (2013.01); *G06F 17/30876* (2013.01); *G11B 27/002* (2013.01); *G11B 27/031* (2013.01); *G11B 27/102* (2013.01); *G11B 27/34* (2013.01); *H04L 65/403* (2013.01); *H04N 5/265* (2013.01)

(56) References Cited

U.S. PATENT DOCUMENTS

| | | | | |
|---|---|---|---|---|
| 8,732,737 B1* | 5/2014 | Kalmes | ................. | H04H 20/38 725/14 |
| 2003/0014404 A1* | 1/2003 | Gutta | .................... | H04N 7/163 |
| 2003/0141665 A1* | 7/2003 | Li | .................... | G06F 17/30787 273/440.1 |
| 2004/0125877 A1* | 7/2004 | Chang | ............... | G06F 17/30787 375/240.28 |
| 2005/0195331 A1* | 9/2005 | Sugano | ............ | G06F 17/30799 348/571 |
| 2006/0136589 A1* | 6/2006 | Konig | ............... | G06F 17/30867 709/224 |
| 2007/0154168 A1* | 7/2007 | Cordray | .................. | H04N 5/76 386/230 |
| 2008/0263591 A1* | 10/2008 | de Heer | ............... | H04N 5/44543 725/38 |
| 2009/0150919 A1* | 6/2009 | Lee | .................... | H04N 7/17309 725/10 |
| 2012/0155834 A1* | 6/2012 | Beacham | ........... | H04N 21/4334 386/241 |
| 2012/0324491 A1* | 12/2012 | Bathiche | ................ | H04H 60/33 725/10 |
| 2013/0176438 A1* | 7/2013 | Mate | ................... | H04N 7/181 348/157 |
| 2013/0259447 A1* | 10/2013 | Sathish | .................... | H04N 9/87 386/278 |
| 2013/0268955 A1* | 10/2013 | Conrad | ................ | H04N 21/252 725/12 |
| 2013/0282747 A1* | 10/2013 | Cheng | ............... | G06F 17/30023 707/758 |
| 2013/0330055 A1* | 12/2013 | Zimmermann | ... | G06F 17/30817 386/240 |
| 2014/0267906 A1* | 9/2014 | Mickelsen | ......... | H04N 21/4131 348/515 |
| 2014/0328570 A1* | 11/2014 | Cheng | .................... | G11B 27/10 386/241 |

* cited by examiner

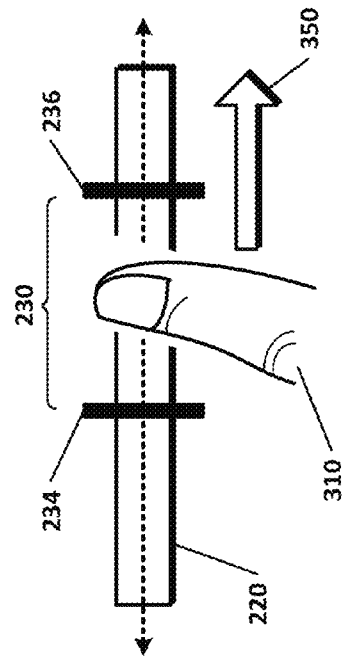
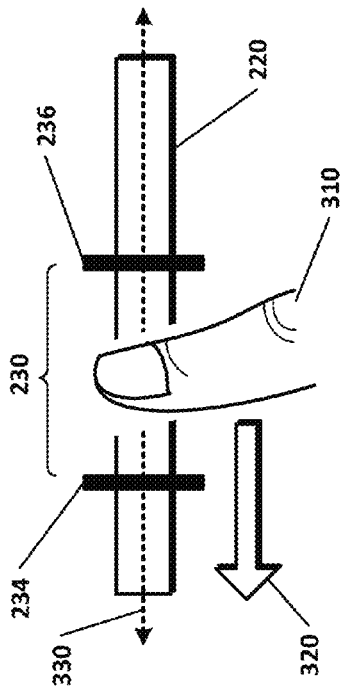
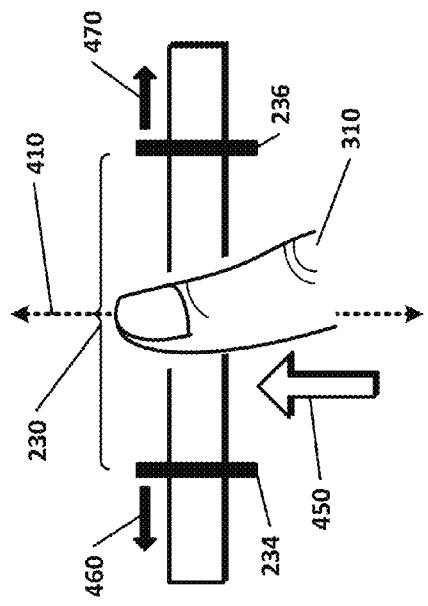
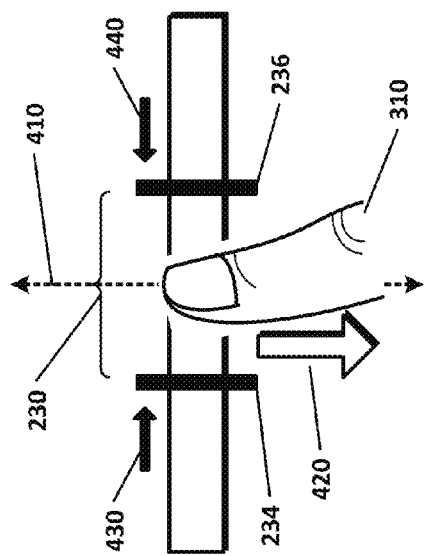
FIG. 3A
FIG. 3B
FIG. 4A
FIG. 4B

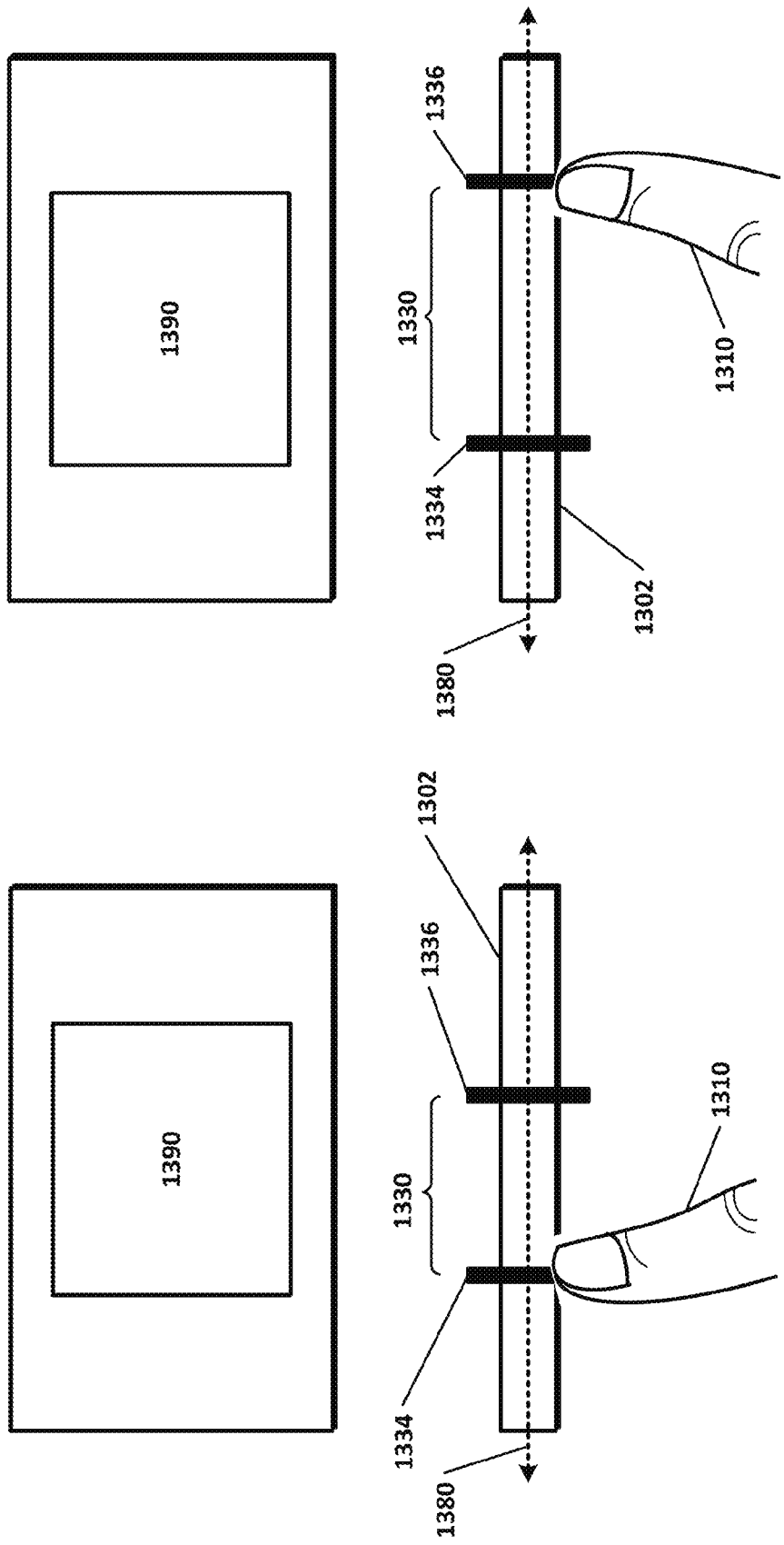

SYSTEMS AND METHODS FOR IDENTIFYING MEDIA PORTIONS OF INTEREST

CROSS-REFERENCE TO RELATED APPLICATIONS

This application claims priority to and the benefit of U.S. Provisional Patent Application No. 62/014,203, filed on Jun. 19, 2014; U.S. Provisional Patent Application No. 62/047,553, filed on Sep. 8, 2014; and U.S. Provisional Patent Application No. 62/131,455, filed on Mar. 11, 2015, the entireties of which are incorporated by reference herein.

BACKGROUND

The present disclosure relates generally to media curation, editing and playback and, more particularly, to systems and methods for identifying portions of interest in audio and video, manipulating media segments using a simplified interface, and forming a representative signature for audio and video based on content signal intensity and social interest.

Creators of media content often generate substantially more content than is needed or used in a final audio and/or video production. Content creators may only be interested in showcasing the most interesting or relevant portions of their generated content to an audience. For example, a snowboarder may desire to exhibit his best tricks on video, while discarding intermediate portions of the video that show him boarding down a mountainside between jumps. While the snowboarder can upload his video and utilize complex video editing software to compile a highlights video once he has returned from the slopes, identifying interesting video segments, editing captured video, and sharing modified content in the midst of his excursion is exceedingly difficult. There is a need for systems and methods that facilitate the foregoing tasks for content creators.

BRIEF SUMMARY

Systems and methods for video editing and playback are disclosed herein. In one aspect, a computer-implemented method comprises: providing a visual representation of a timeline of media content wherein the timeline comprises a plurality of different time positions in the media content; indicating a selected portion of the timeline in the visual representation wherein the selected portion is a continuous region of the timeline bounded by a first border and a second border wherein each border corresponds to a different respective time position on the timeline; receiving a first user input action along a first axis of the timeline; changing a position of the selected portion in the visual representation along the timeline and based on the first user input action; receiving a second user input action along a second axis of the timeline; and resizing the selected portion in the visual representation based on the second user input action wherein resizing the selected portion comprises moving both of the respective time positions of the borders to be closer to each other or farther from each other. The media content can comprise at least one of video and audio. Other embodiments of this aspect include corresponding systems and computer programs.

In one implementation, the first axis is parallel to the timeline. The first axis can also be coaxial with the timeline, and the second axis can be perpendicular to the first axis. A particular user input action can include a touchscreen gesture, a mouse gesture, a tap, a click, a click-and-drag, a tracked free-hand gesture, a tracked eye movement, a button press, or an applied pressure.

In another implementation, the selected portion moves along the timeline simultaneously with receiving the first user input action. The first user input action can comprise a motion between a first point on the timeline and a second point on the timeline, and the selected portion can move from the first point to the second point in direct correspondence with the first user input action.

In one implementation, the second user input action comprises a motion along a first direction of the second axis, and the borders can be moved closer to each other simultaneously with receiving the second user input action. The second user input action can comprise a motion along a second direction, opposite the first direction, of the second axis, and the borders can be moved farther from each other simultaneously with receiving the second user input action.

In a further implementation, the method comprises receiving a third user input action along a third axis of the timeline; and splitting the media content into a plurality of selected portions based on a position of the selected portion on the timeline when the third user input action is received. The third axis can be perpendicular to the first axis and the second axis.

In yet another implementation, the timeline comprises visual indicators identifying of portions of interest of the media content.

In another aspect, a computer-implemented method comprises: providing a visual representation of a timeline of media content wherein the timeline comprises a plurality of different time positions in the media content; indicating a selected portion of the timeline in the visual representation wherein the selected portion is a continuous region of the timeline bounded by a first border and a second border wherein each border corresponds to a different respective time position on the timeline; receiving a user input action along an axis perpendicular to the timeline; and resizing the selected portion in the visual representation based on the user input action wherein resizing the selected portion comprises moving both of the respective time positions of the borders to be closer to each other or farther from each other. Other embodiments of this aspect include corresponding systems and computer programs.

In one implementation, a particular user input action is a touchscreen gesture, a mouse gesture, a tap, a click, a click-and-drag, a tracked free-hand gesture, a tracked eye movement, a button press, or an applied pressure. The user input action can comprise a motion along a first direction of the axis, and the borders can be moved closer to each other simultaneously with receiving the user input action. The user input action can comprise a motion along a second direction, opposite the first direction, of the axis, and the borders can be moved farther from each other simultaneously with receiving the user input action.

In another implementation, the method further comprises generating second media content based on the selected portion, the second media content comprising at least a portion of the media content.

In another aspect, a computer-implemented method comprises: receiving a video comprising a plurality of signals, at least one signal representing an identifiable type of content over a length of the video; for at least one of the signals: identifying at least one intermediate portion of interest in the video based on the signal, and associating a weighting with the signal, wherein the weighting is determined based at least in part on historical attributes associated with at least one of an individual and a group of users; and identifying one or more overall portions of interest of the video based on the at least one intermediate portion of interest and the at least one signal weighting. Other embodiments of this aspect include corresponding systems and computer programs.

In one implementation, the identifiable type of content for a particular signal is selected from the group consisting of motion, sound, presence of faces, recognized faces, recognized objects, recognized activities, and recognized scenes. At least one of the signals can comprise sensor readings over a length of the video. The sensor can comprise an accelerometer, a gyroscope, a heart rate sensor, a compass, a light sensor, a GPS, or a motion sensor.

In another implementation, a particular intermediate portion of interest in the video is identified based on an intensity of the signal. Identifying a particular overall portion of interest of the video can comprise: combining the signals according to the respective weighting of each signals; identifying a portion of the combined signals that meets a threshold signal intensity; and identifying as the particular overall portion of interest a portion of the media content that corresponds to the identified portion of combined signals. Identifying a particular overall portion of interest of the video can also comprise: combining the signals according to the respective weighting of each signals; identifying a portion of the combined signals that comprises a high or low signal intensity relative to other portions of the combined signals; and identifying as the particular overall portion of interest a portion of the media content that corresponds to the identified portion of combined signals.

In a further implementation, associating a weighting with a particular signal comprises: training a classifier to predict whether a given signal weighting would result in identifying a portion of interest in media content using the historical attributes associated with the group of users; and providing attributes associated with the particular signal as input to the classifier and obtaining the weighting for the particular signal as output of the classifier.

In yet another implementation, the individual is an editor of the video. A particular historical attribute associated with an editor of the video can comprise: a propensity of the editor to favor video content having a particular signal, a propensity of the editor to favor video content lacking a particular signal, a propensity of the editor to favor video content having a particular signal with a particular signal intensity, a propensity of the editor to disfavor video content having a particular signal, a propensity of the editor to disfavor video content lacking a particular signal, or a propensity of the editor to disfavor video content having a particular signal with a particular signal intensity.

A particular historical attribute associated with the group of users can comprise: a propensity of the group of users to favor video content having a particular signal, a propensity of the group of users to favor video content lacking a particular signal, a propensity of the group of users to favor video content having a particular signal with a particular signal intensity, a propensity of the group of users to disfavor video content having a particular signal, a propensity of the group of users to disfavor video content lacking a particular signal, or a propensity of the group of users to disfavor video content having a particular signal with a particular signal intensity.

In one implementation, the method further comprises: for at least one of the signals, associating a second weighting with the signal, wherein the second weighting is determined based at least in part on historical attributes associated with one or more of an editor of the video, a user other than the editor, and a group of users; and identifying one or more second overall portions of interest of the video based on the at least one intermediate portion of interest and the at least one second signal weighting.

In another implementation, the method further comprises: providing a visual representation of a timeline of the video wherein the timeline comprises a plurality of different time positions in the video; and indicating the identified overall portions of interest in the visual representation of the timeline.

In another aspect, a computer-implemented method comprises: providing a visual representation of a timeline of a video wherein the timeline comprises a plurality of different time positions in the video; providing a visual representation of one or more signals along the timeline of the video, wherein each signal representation comprises a respective intensity of the signal over the time positions; receiving, from each of a plurality of users, an indication of interest in a portion of the video; and providing a visual representation on the timeline of each indication of interest. Other embodiments of this aspect include corresponding systems and computer programs.

In one implementation, the visual representation of the signals comprises a visual representation of a weighted sum of signals. A particular indication of interest can comprise a comment, a like, a share, or a highlight.

In another implementation, the method further comprises determining a social signal based on the indications of interest, wherein an intensity of the social signal over a length of the video is based on a concentration of the indications of interest over the length of the video. The method can further comprise: receiving a second video comprising a plurality of signals, each signal representing an identifiable type of content over a length of the video; for at least one of the signals, associating a weighting with the signal, wherein the weighting is determined based at least in part on the social signal; and identifying one or more portions of interest in the second video based on the at least one signal weighting. The weighting can be determined based at least in part on the intensity of the social signal. The weighting can also be determined based at least in part on indications of interest from a plurality of videos.

In a further implementation, a particular signal represents one of motion, sound, presence of faces, recognized faces, recognized objects, recognized activities, recognized scenes, sensor readings, context, or user-specified.

In another aspect, a computer-implemented method comprises: receiving on a user device media content comprising a digital video or a digital photograph; providing a plurality of filters that can be applied to at least a portion of the media content; determining a subset of the plurality of filters to recommend to a user of the device based on one or more attributes associated with at least one of the media content, the user, a group of users, or the user device; visually identifying the subset of recommended filters; receiving from the user a selection of one or more of the plurality of filters; and applying the selected one or more filters to the digital content.

A particular attribute associated with the media content can include geolocation, a point of interest, motion, sound, a recognized face, a recognized object, a recognized activity, or a recognized scene. A particular attribute associated with the user can include a historical filter preference of the user or a recent filter preference of the user. A particular attribute associated with a group of users can include a historical filter preference of the group of users or a recent filter preference of the group of users. A particular attribute associated with the user device can include a property of an image sensor of the user device, a device model, or an image capture setting.

In one implementation, determining the subset of the plurality of filters to recommend to a user of the device comprises: training a classifier to predict whether a given combination of attributes would result in a particular filter being selected by a user based on historical filter selections and corresponding historical attributes associated with at least one of media content, a user, a group of users, or a user device; and providing one or more attributes associated with at least one the media content, the user, a group of users, or the user device as input to the classifier and obtaining the subset of recommended filters as output of the classifier.

In one aspect, a computer-implemented method comprises: providing a visual representation of a timeline of a video wherein the timeline comprises a plurality of different time positions in the video; indicating a selected portion of the timeline in the visual representation wherein the selected portion is a continuous region of the timeline bounded by a first border and a second border wherein each border corresponds to a different respective time position on the timeline; receiving a first user input action along a first axis of the timeline; changing a position of the first border along the timeline and based on the first user input action; receiving a second user input action; and simultaneously displaying a first portion of the video and a second portion of the video. Other embodiments of this aspect include corresponding systems and computer programs.

In one implementation, the method further comprises receiving a third user input action along the first axis of the timeline; and changing a position of the second border along the timeline and based on the third user input action. The first axis can be parallel to the timeline, as well as coaxial with the timeline.

In another implementation, the second user input action comprises a motion along a second axis of the timeline. The second axis can be perpendicular to the first axis.

In a further implementation, the displayed first portion of the video comprises an image corresponding to a portion of the video at a beginning of the selected portion with respect to the timeline. In another implementation, the displayed second portion of the video comprises an image corresponding to a portion of the video at an end of the selected portion with respect to the timeline.

In yet another implementation, a particular user input action is a touchscreen gesture, a mouse gesture, a tap, a click, a click-and-drag, a tracked free-hand gesture, a tracked eye movement, a button press, or an applied pressure.

In one implementation, the first border moves along the timeline simultaneously with receiving the first user input action. Likewise, the second border can move along the timeline simultaneously with receiving the third user input action. The first user input action can include a motion between a first point on the timeline and a second point on the timeline, and the first border can move from the first point to the second point in direct correspondence with the first user input action. Similarly, the third user input action can include a motion between a first point on the timeline and a second point on the timeline, and the second border can move from the first point to the second point in direct correspondence with the third user input action.

In a further implementation, the method includes updating the displayed first portion of the video to correspond to a change in position of the first border along the timeline. The method can further include updating the displayed second portion of the video to correspond to a change in position of the second border along the timeline In another implementation, the video is a first video, and the method further includes generating a second video based on the selected portion, the second video comprising at least a portion of the first video The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which:

FIGS. 3A and 3B depict example user input motions for positioning a selected portion on a timeline.

FIGS. 4A and 4B depict example user input motions for resizing a selected portion on a timeline.

FIGS. 13A-13C depict example user input motions for defining a selected portion on a timeline.

DETAILED DESCRIPTION

Described herein in various implementations are systems and methods for editing, manipulating, and viewing media content. Media content can include digital media encoded in a machine-readable format, including but not limited to audio (e.g., sound recordings of events, activities, performances, speech, music, etc.), video (visual recordings of events, activities, performances, animation, etc.), and other forms of media content usable in conjunction with the techniques described herein. Media content can also include streaming media (recorded or live).

Figure 1:
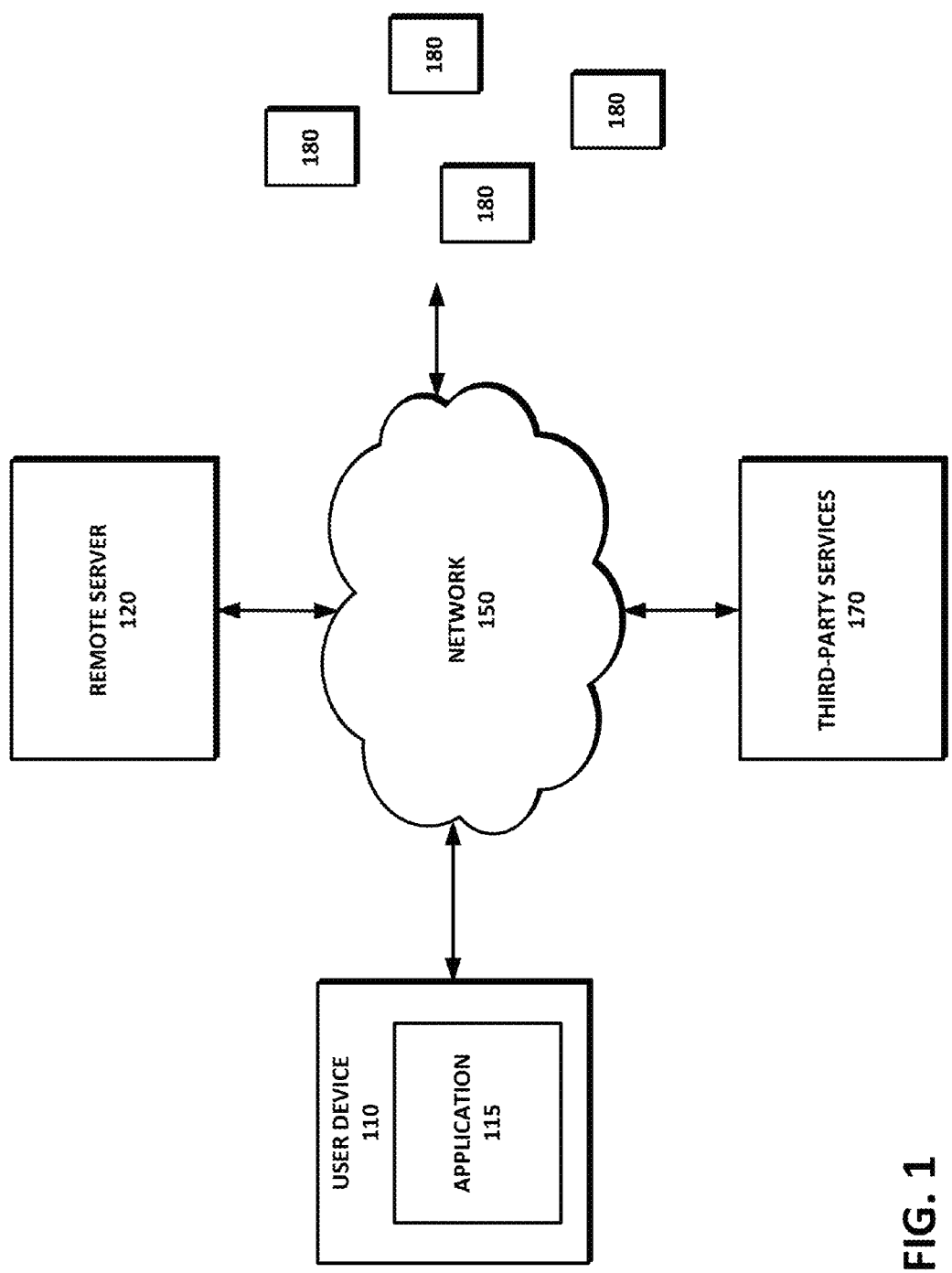
FIG. 1 depicts an example system architecture for a video editing and playback system according to an implementation.

FIG. 1 depicts an example high-level system architecture in which an application 115 on a user device 110 communicates with one or more remote servers 120 over communications network 150. The user device 110 can be, for example, a smart phone, tablet computer, smart watch, smart glasses, portable computer, mobile telephone, laptop, palmtop, gaming device, music device, television, smart or dumb terminal, network computer, personal digital assistant, wireless device, information appliance, workstation, minicomputer, mainframe computer, or other computing device, that is operated as a general purpose computer or as a special purpose hardware device that can execute the functionality described herein.

The application 115 on the user device 110 can provide media playback and editing functionality to a device user. In one implementation, the application 115 provides a user interface that allows a user to browse through, manipulate, edit, and/or play media content (e.g., a video file, an audio file, etc.) using a visual representation of a timeline. In another implementation, the application 115 analyzes media content to identify one or more portions of interest, which analysis can be based on a weighting of various signals associated with the content. As used herein, a "signal" refers to time-varying data describing an identifiable type of content in audio, video, or other media content or a portion thereof, including, but not limited to, motion data (e.g., displacement, direction, velocity, acceleration, orientation, angular momentum, and time), sound, geographic location, presence of faces, recognized faces, recognized objects, recognized activities, and recognized scenes. A signal can also refer to a time-varying or static attribute associated with media content or a portion thereof, including, but not limited to, popularity (e.g., measurement of likes, recommendations, sharing), context, sensor readings on a device (e.g., readings from an accelerometer, gyroscope, heart rate sensor, compass, light sensor, motion sensor, and the like), user label (e.g., a comment, hashtag, or other label that can provide hints as to the content of a media file), location, date, time, weather, and user-specified (e.g., manually-defined as interesting). Signal weighting data can be stored locally on the user device 110 and/or can be transferred to and received from remote server 120.

Remote server(s) 120 can aggregate signal weighting data, social experience information, and other media analytics received from user device 110 and other user devices 180 and share the data among the devices over communications network 150. In some implementations, remote server(s) 120 host and/or proxy media, webpages, and/or other content are accessible by the user device 110 via application 115. Remote server(s) 120 can also perform portions of the various processes described herein; for example, analysis of media content to identify signals can be performed in whole or in part remotely, rather than locally on the user device 110.

Third-party services 170 can include social networking, media sharing, content distribution, and/or other platforms through which a user can send, receive, share, annotate, edit, track, or take other actions with respect to media content using, e.g., application 115 via communications network 150. Third-party services 170 can include, but are not limited to, YouTube, Facebook, WhatsApp, Vine, Snapchat, Instagram, Twitter, Flickr, and Reddit.

Implementations of the present system can use appropriate hardware or software; for example, the application 115 and other software on user device 110 and/or remote server(s) 120 can execute on a system capable of running an operating system such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

Additionally or alternatively, some or all of the functionality described herein can be performed remotely, in the cloud, or via software-as-a-service. For example, as described above, certain functions, such as those provided by the remote server 120, can be performed on one or more servers or other devices that communicate with user devices 110, 180. The remote functionality can execute on server class computers that have sufficient memory, data storage, and processing power and that run a server class operating system (e.g., Oracle® Solaris®, GNU/Linux®, and the Microsoft® Windows® family of operating systems).

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor receives instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In some implementations, the user device 110 includes a web browser, native application, or both, that facilitates execution of the functionality described herein. A web browser allows the device to request a web page or other program, applet, document, or resource (e.g., from a remote server 120 or other server, such as a web server) with an HTTP request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the user device 110 manually requests a resource from a server. Alternatively, the device 110 automatically makes requests with a browser application. Examples of commercially available web browser software include Microsoft® Internet Explorer®, Mozilla® Firefox®, and Apple® Safari®.

In other implementations, the user device 110 includes client software, such as application 115. The client software provides functionality to the device 110 that provides for the implementation and execution of the features described herein. The client software can be implemented in various forms, for example, it can be in the form of a native application, web page, widget, and/or Java, JavaScript, .Net, Silverlight, Flash, and/or other applet or plug-in that is downloaded to the device and runs in conjunction with a web browser. The client software and the web browser can be part of a single client-server interface; for example, the client software can be implemented as a plug-in to the web browser or to another framework or operating system. Other suitable client software architecture, including but not limited to widget frameworks and applet technology can also be employed with the client software.

A communications network 150 can connect user devices 110, 180 with one or more servers or devices, such as remote server 120. The communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network 150 can carry TCP/IP protocol communications, and HTTP/HTTPS requests made by a web browser, and the connection between the client device and servers can be communicated over such TCP/IP networks. Other communication protocols are contemplated.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
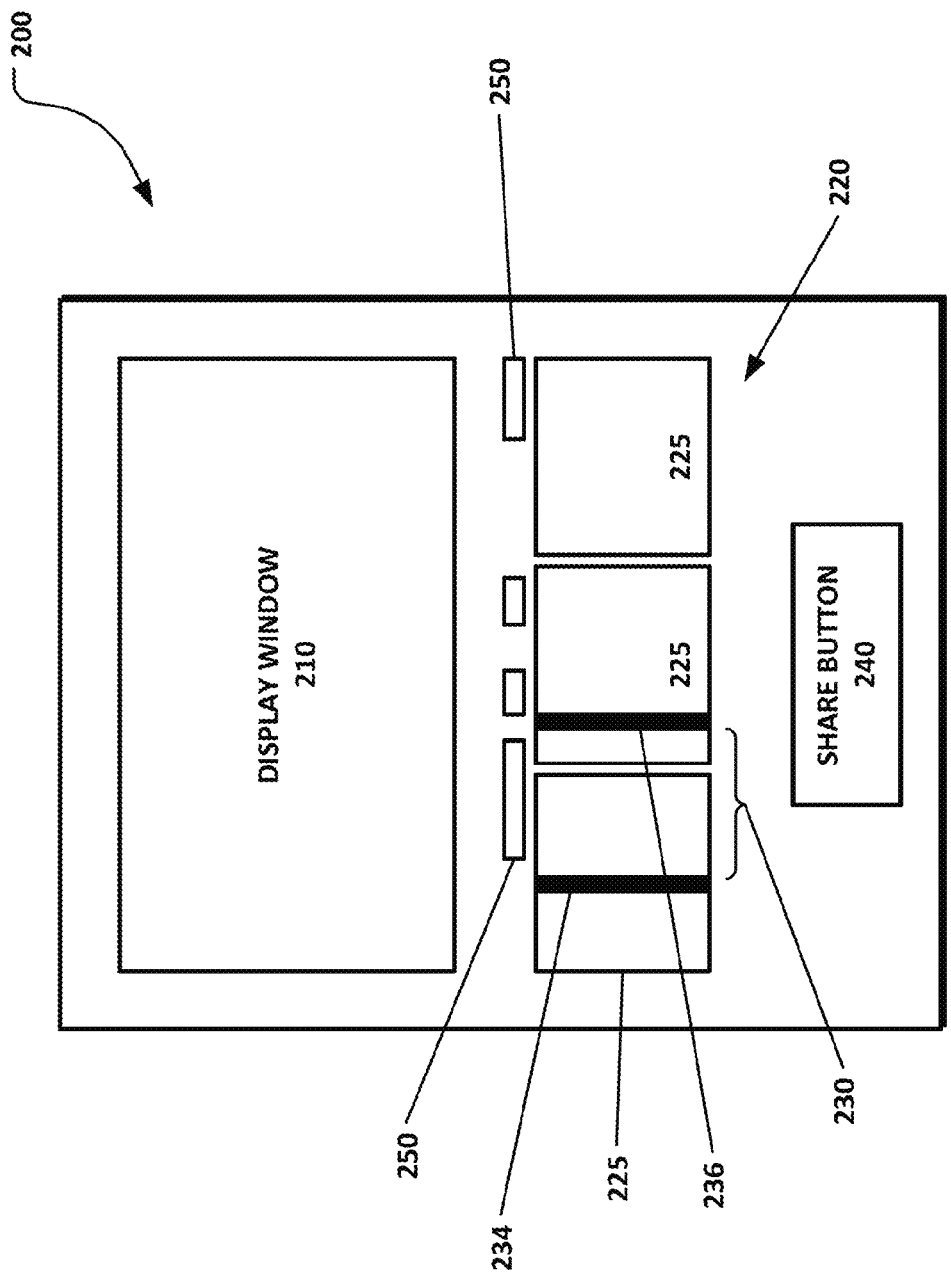
FIG. 2 depicts an example user interface for a video editing system according to an implementation.

FIG. 2 depicts an example user interface (UI) 200 of application 115 for the playback and editing of media content, such as audio and/or video captured by a mobile device. UI 200 includes a visual timeline representation 220 that a user can manipulate to navigate and/or edit the media content. In one implementation, if the media content is streaming (whether live or prerecorded), the timeline 220 can be dynamically updated or otherwise moving in a synchronized manner with the media stream. Playback of the media content, or a selected portion thereof, can be shown in display window 210. If the media content does not include video or other image-based content, the display window 210 can be hidden, blank, or display a visual representation of the content (e.g., a sound wave or captions for audio). UI 200 further includes a "Share" button 240 that enables the user to indicate that the media content can be transmitted from the user's device 110 to one or more third-parties services 170. The application 115 can be configured with the user's third-party service account information such that the "Share" button 240 requires a single interaction to upload the current media content to one or more of the services. The user can also be provided with a dialog that allows the user to select which third-party services will be sent the content. Communication between the application 115 on the user device 110 and the third-party services 170 can be direct, or in some implementations, the application 115 provides the media content to remote server 120, which interfaces with the various third-party services 170 and relays the content appropriately.

The timeline 220 can include graphical and/or textual elements and can be, for example, a continuous track that includes visual indicators (e.g., ticks, icons, colors, etc.) of different time positions in the video. In one implementation, the timeline 220 includes thumbnails 225 of individual video frames representing respective portions of a video file. The thumbnails 225 can hover, change in size, scroll, and/or otherwise be manipulated on the timeline 220 as the user interacts with the UI 200. In one example, if the user device 110 includes a touchscreen interface (e.g., a smartphone), the user can manipulate the video frame thumbnails 225 on the timeline 220 using his thumb, fingers, a stylus, or other input apparatus. Based on the size of the thumbnails 225, screen size, and/or display resolution of the device 110, only a portion of the timeline 220 (and thus a subset of the thumbnails 225) may be visible at any one time. The user then can move along the timeline 220 by, for example, swiping the thumbnails 225 along an axis of the timeline, moving the thumbnails 225 on or off the visible portion of the timeline 220 on the device screen. In other implementations, the entire timeline 220 and displayed thumbnails 225 are sized and/or positioned to fit on the device screen.

In one implementation, the timeline 220 includes one or visual indicators delineating a selected portion 230 of the timeline 220. The selected portion 230 can be a continuous region of the timeline 220 that is bounded by a first border 234 and a second border 236. Each border 234, 236 can correspond to a different respective time position on the timeline 220. The selected portion can be moved, resized, split, or otherwise manipulated upon the application 115 receiving a user input action. The user input action can be received via a component of the user device 110 (e.g., touchscreen, touchpad, pointing stick, click wheel, camera, microphone, gyroscope, accelerometer, built-in keyboard, etc.) and/or an separate input peripheral coupled to the user device 110 (e.g., mouse, keyboard, trackball, joystick, camera, microphone, game controller, virtual headset, etc.). The user input action can be, for example, a touchscreen gesture, a mouse gesture, a tap, a click, a click-and-drag, a tracked eye movement, a button press, an applied pressure, or other input action suitable for allowing a user to manipulate the selected portion 230 of the timeline 220. In one implementation, the user input action is a tracked free-hand gesture captured in conjunction with a user's use of an Oculus or other virtual reality device, where the user is presented with the timeline 220 in three-dimensional space, and the selected portion 230 where the window can be adjusted based on a single free-hand movement along a particular axis).

In various implementations, the selected portion 230 and/or other components of the timeline 220 are manipulated by the one or more user input actions. For example, the position of the selected portion 230 on the timeline 220 can be changed by a user input action substantially on or along a first axis of the timeline 220 (e.g., some deviation in the input action can be tolerated). The first axis can be, e.g., parallel to or coaxial with the timeline 220, perpendicular to the timeline, angled, or disposed in another position in relation to the timeline 220, in two-dimensional coordinate space (x, y) or three-dimensional coordinate space (x, y, z). There can be multiple axes that permit the user to change the position of the selected portion 230. In some implementations, the selected portion 230 follows the direction of the user's finger, stylus, mouse cursor, or other means of input. In one implementation, the user moves the selected portion 230 by interacting directly with the selected portion 230 whereas, in another implementation, the user can move the selected portion 230 by interacting with any portion of the timeline 220 and/or the first axis. For instance, the user can cause the selected portion 230 to jump to a different area of the timeline 220 by tapping, clicking, pressing, or taking other action with respect to the different area. In further implementations, the first axis is disposed above the timeline 220, below the timeline 220, or at another position on the UI 200.

As shown in FIG. 3A, in one implementation, a user moves the selected portion 230 (and simultaneously the corresponding borders 234 and 236) in direction 320 by swiping his thumb (or finger) 310 in the same direction 320 along horizontal (x) axis 330, which in this example is coaxial with the timeline 220. Likewise, as shown in FIG. 3B, the user can move the selected portion 230 (and simultaneously the corresponding borders 234 and 236) in the opposite direction 350 by swiping his thumb 310 in that opposite direction 350 along horizontal axis 330. In some implementations, the user's thumb 310 must be positioned on a border 234, 236 or between the borders 234 and 236 to cause the selected portion 230 to move along the timeline 220. The repositioning of the selected portion 230 can be simultaneous with and track the movement of the user's thumb 310 (e.g., the further the user moves his thumb 310 along the horizontal axis 330, the further the selected portion 230 is moved on the timeline). Of note, by allowing the user to reposition the selected portion 230 with a single thumb or finger, the user is able to hold the user device 110 and operate the UI 200 with one hand.

In another example, the selected portion 230 can be resized (i.e., one or both of the borders 234, 236 is moved closer or further away from the other border(s)) by a user input action substantially along a second, different axis of the timeline 220 (e.g., some deviation in the input action can be tolerated). The second axis can be, e.g., parallel to or coaxial with the timeline 220, perpendicular to the timeline, angled, or disposed in another position in relation to the timeline 220, in two-dimensional coordinate space (x, y) or three-dimensional coordinate space (x, y, z). There can be multiple axes that permit the user to resize the selected portion 230. In some implementations, the selected portion 230 is resized based on the direction of the user's finger, stylus, mouse cursor, or other means of input. In one implementation, the user resizes the selected portion 230 by interacting directly with the selected portion 230 whereas, in another implementation, the user can resize the selected portion 230 by interacting with any portion of the timeline 220 and/or the second axis. In further implementations, the second axis is disposed above the timeline 220, below the timeline 220, or at another position on the UI 200.

In some implementations, the selected portion 230 can snap to one or more various preset sizes while being resized. A particular snap-to size can be based on which third-party service(s) 170 are available to the user for sharing or saving media content, which service(s) 170 the user has specifically configured for use with the application 115, which service(s) 170 the user has previously used to share content, and/or which services(s) 170 the system predicts the user will use to share content. Custom snap-to sizes can also be manually configured by the user. In some implementations, upon opening media content in the application 115, the selected portion 230 defaults to a preset size based on, for example, one or more of the above factors. As one example, if the user most frequently posts video content to Vine, the selected portion 230 can default to a six-second time span.

As shown in FIG. 4A, in one implementation, a user resizes (reduces the size of) the selected portion 230 (and simultaneously moves the borders 234 and 236 inward toward each other; namely, border 234 in direction 430 and border 236 in direction 440) by swiping his thumb 310 in direction 420 along vertical (y) axis 410, which in this example is perpendicular with the timeline 220 and horizontal axis 330. Likewise, as shown in FIG. 4B, the user can resize (increase the size of) the selected portion 230 (and simultaneously move the borders 234 and 236 away from each other; namely, border 234 in direction 460 and border 236 in direction 470) by swiping his thumb 310 in the opposite direction 450 along vertical axis 410. The resizing of the selected portion 230 can be simultaneous with and track the movement of the user's thumb 310 (e.g., the further the user moves his thumb 310 along the vertical axis 410, the more the selected portion 230 is increased or reduced in size). Of note, by allowing the user to resize the selected portion 230 with a single thumb or finger, the user is able to hold the user device 110 and operate the UI 200 with one hand.

In another example, a user can increase the size of the selected portion 230 (i.e., move the borders 234 and 236 away each other) by swiping his thumb 310 along vertical (y) axis 410 in a direction away from the horizontal axis 330 (either up or down). The user can then reduce the size of the selected portion 230 by moving his thumb 310 in the opposite direction along vertical (y) axis 410, back toward horizontal axis 330. Effectively, this is an absolute value for the size of the selected portion 230 based on distance up or down from horizontal axis 330.

In some implementations, minimum and/or maximum constraints are set for the size of the selected portion 230. For example, if the minimum length of a video is one second, the minimum length of the selected portion 230 can also be set to one second. The maximum selection length can also vary based on, e.g., where the video will be shared (on Vine, the maximum length is six seconds).

In another example, the selected portion 230 can delineate a portion of the media content that should be removed, retained, or ignored (effectively splitting the media content) by a user input action substantially along a third, different axis of the timeline 220 (e.g., some deviation in the input action can be tolerated). The third axis can be, e.g., parallel to or coaxial with the timeline 220, perpendicular to the timeline, angled, or disposed in another position in relation to the timeline 220, in two-dimensional coordinate space (x, y) or three-dimensional coordinate space (x, y, z). There can be multiple axes that permit the user to split the media content via the selected portion 230. In one implementation, the user splits the media content by interacting directly with the selected portion 230 whereas, in another implementation, the user can split the media content by interacting with any portion of the timeline 220 and/or the third axis. In further implementations, the third axis is disposed above the timeline 220, below the timeline 220, or at another position on the UI 200.

Figure 5:
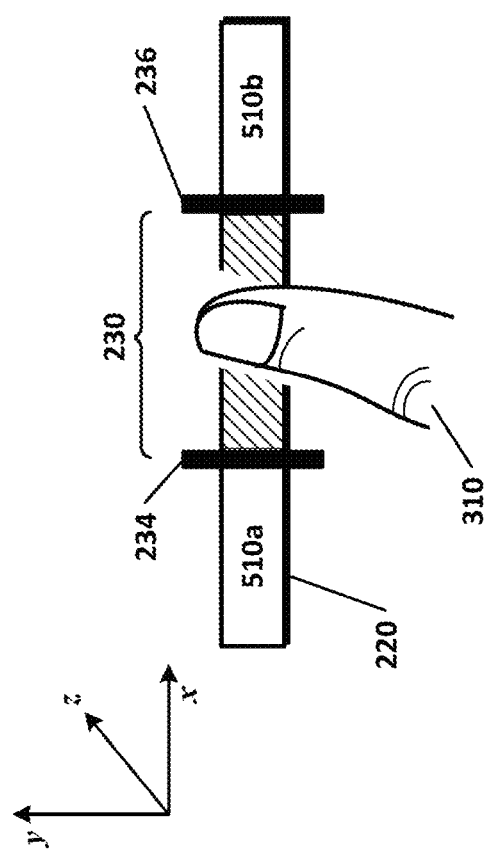
FIG. 5 depicts an example user input motion for splitting media content on a timeline.

As shown in FIG. 5, in one implementation, a user splits the video by tapping, pressing, clicking (or other user input action) along a z-axis perpendicular to both horizontal x-axis 330 and vertical y-axis 410. For instance, by tapping on the selected portion 230, the video is split into two portions 510a and 510b on either side of the selected portion 230, and the video segment delineated by the selected portion 230 is discarded from the video or otherwise ignored for video playback, saving, and/or sharing. In one implementation, by tapping on the selected portion 230, the split portions 510a and 510b become selected portions, and the selected portion 230 is deselected. In another example, by tapping on the selected portion 230, the two portions 510a and 510b are discarded from the video or otherwise ignored, leaving just the selected portion 230. In some implementations, the user can create multiple selected portions by interacting with multiple portions of the timeline 220 (e.g., tapping on different areas of the timeline 220). The user can also interact again with a particular selected portion 230 to invert or cancel the selection.

Figure 13C:
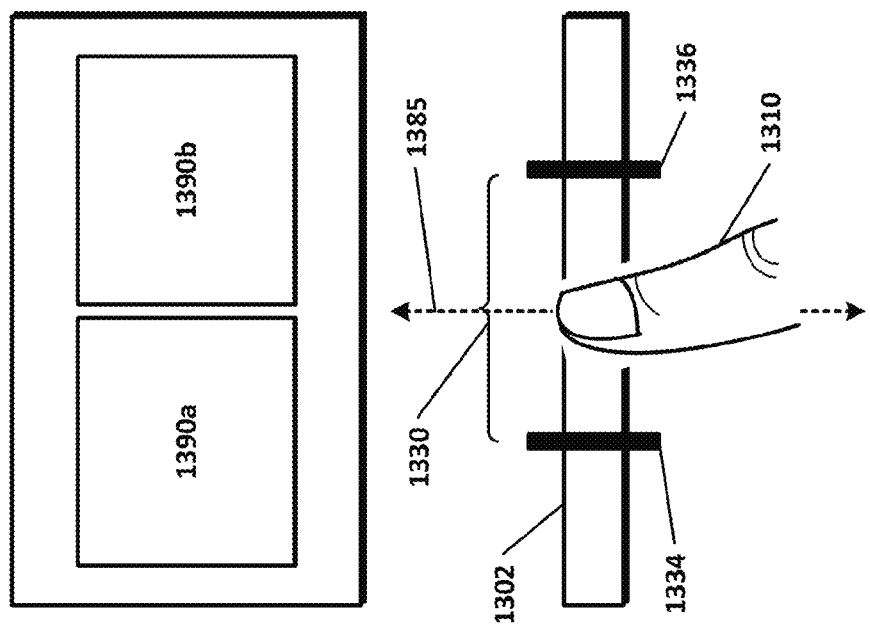

FIGS. 13A-13C illustrate an example technique for selecting a starting point and ending point of a selected portion of a video using a video editing interface. As shown in FIG. 13A, in one implementation, a user can adjust the size of a selected portion 1330 of a video along a video timeline 1302 by manipulating the left border 1334 of the portion 1330 independently of the right border 1336. For example, the user can swipe his thumb (or finger) 1310 along horizontal axis 1380 of the video timeline 1302 to increase (by swiping to the left) or decrease (by swiping to the right) the size of the selected portion 1330. Display 1390 shows one or more images derived from one or more frames of the video. For example, display 1390 can show a static image or a video clip (e.g., the portion of the video within the boundaries of the selected portion 1330). The image(s) can correspond to the first frame, last frame, or an intermediate frame(s) from a portion of the video that is defined by the selected portion 1330.

FIG. 13B further illustrates the resizing of the selected portion 1330 by manipulating the right border 1336 of the selected portion 1330 independently of the left border 1334. As described above with respect to the manipulation of the left border 1334, a user can swipe his thumb (or finger) 1310 along horizontal axis 1380 of the video timeline 1302 to increase (by swiping to the right) or decrease (by swiping to the left) the size of the selected portion 1330. Again, display 1390 can show one or more images from one or more frames (e.g., first, last, or intermediate frame(s)) from a portion of the video defined by the selected portion 1330.

Referring to FIG. 13C, the user can interact with the video editing interface to create a split-display based on the selected portion 1330. In one example, the interaction is a motion (e.g., swipe) that the user makes with his thumb (or finger) 1310 along a different axis, such as vertical axis 1385. In other instances, the interaction is a tap on the selected portion 1330, a tap on a separate interface button, or other user action. In the depicted example, the user swipes his thumb 1310 in a downward direction along axis 1385, which causes display 1390 from FIGS. 13A and 13B to split into two (or, in some instances, more than two) individual displays 1390a, 1390b. In one implementation, display 1390a corresponds to a portion of the video marked by or abutting border 1334 with respect to the timeline 1302, and display 1390b corresponds to a portion of the video marked by or abutting border 1336 with respect to the timeline 1302. For example, display 1390a can show an image or short video clip corresponding to the start of the video within the selected portion 1330. Similarly, display 1390b can show an image or short video clip corresponding to the end of the video within the selected portion 1330. Other displays can show, e.g., intermediate portions of the video within the selected portion 1330.

Referring back to FIG. 2, the timeline 220 can also include visual indicators of portions of interest 250 in the media content, as further described below. The visual indicators 250 can include graphics and/or text, and can include various shapes, colors, icons, animations, and so on, that indicate different types of portions of interest (e.g., based on sound, motion, facial recognition, and/or other signals). A particular visual indicator 250 can designate a starting point of a portion of interest, an ending point of a portion of interest, and/or a continuous portion of the content that is of interest. In some implementations, the visual indicators facilitate a user's navigation of the timeline 220 by notifying (actively and/or passively) the user which segments of the video may be interesting to the user. In some implementations, the user can interact with a particular visual indicator 250 to jump to that position in the timeline 220 and/or to view more information about why the video segment is considered to be interesting. In another implementation, the timeline 220 further includes visual indicators that identify points and/or portions of interest manually tagged by a user, whether during or after recording of the content.

Figure 6:
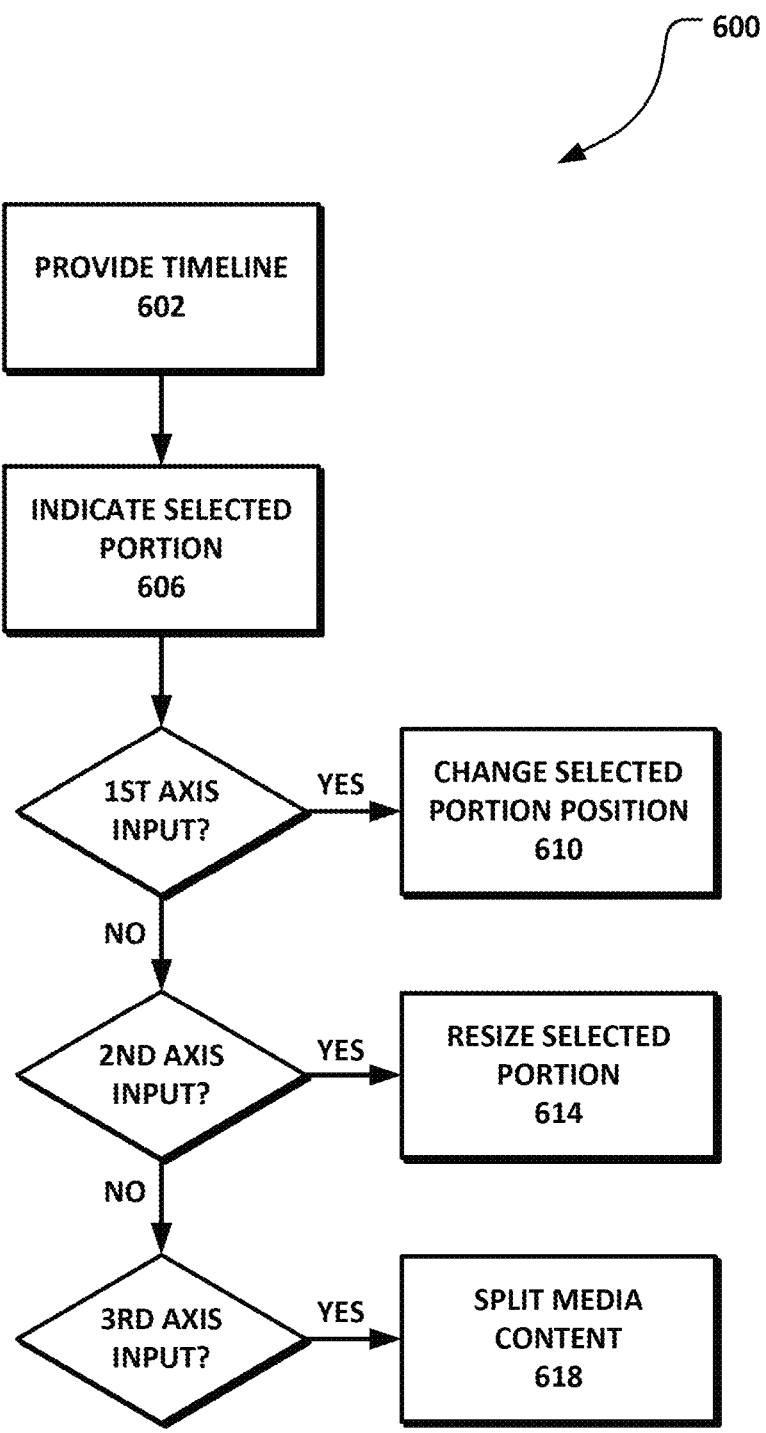
FIG. 6 depicts a flowchart of an example method for manipulating a selected portion of a timeline.

FIG. 6 depicts one implementation of a method 600 for manipulating the selected portion 230 in the timeline 220. In STEP 602, a visual representation of a timeline of media content is provided in UI 200 of application 115. The timeline 220 comprises a plurality of different time positions in the media content. A selected portion 230 of the timeline 220 is indicated as a continuous region of the timeline 220 bounded by a first border 234 and a second border 236 (STEP 606). Each border 234, 236 of the region corresponds to a different respective time position on the timeline 220. If the UI 200 receives a first user input action along a first axis of the timeline 220 (e.g., a touchscreen swipe along a horizontal timeline axis), the position of the selected portion 230 is changed based on the first user input action (STEP 610). If the UI 200 receives a second user input action along a second axis of the timeline 220 (e.g., a touchscreen swipe along a vertical timeline axis), the selected portion 230 is resized based on the second user input action (STEP 614). Resizing the selected portion 230 can include moving both of the respective time positions of the borders to be closer to each other or farther from each other. If the UI 200 receives a third user input action along a third axis of the timeline 220 (e.g., a tap along a z-axis of the timeline 220), the media content is split into a plurality of portions based on the position of the selected portion 230 on the timeline 220 when the third user input action is received (STEP 618).

In one implementation, the application 115 on the user device 110 automatically identifies one or more portions of media content that may be of interest to the device user. The automatic identification can also be performed remotely, wholly or in part, by, e.g., remote server 120. Portions of interest in media content can be automatically identified based on one or more signals associated with the content. As described above, a signal can represent an identifiable type of content within digital media (e.g., motion, sound, recognized faces (known or unknown people), recognized objects, recognized activities, recognized scenes, and the like), as well as an attribute associated with the media (e.g., popularity, context, location, date, time, weather, news reports, and so on).

A signal can vary in intensity over the length of an audio file, video file, or other media content. "Signal intensity," as used herein, refers to the presence of a particular content type in media content and, in some cases, the extent to which the content type exists in a particular portion of the media content. In the case of explicit signals and certain attributes associated with media content, signal intensity can be binary (e.g., exists or does not exist). For content types such as motion, sound, facial recognition, and so on, as well as certain sensor readings the intensity can be a function of the concentration of the content type in a particular portion of the media content, and can, for example, vary over a fixed range or dynamic range (e.g., defined relative to the intensities over the signal domain and/or relative to other signals), or fall into defined levels or tiers (e.g., zero intensity, low intensity, medium intensity, high intensity). In the case of motion content, portions of a media file that are determined to have higher instances of movement (or a particular type of movement indicative of a particular activity such as, for example, skiing or bicycle riding) will have correspondingly higher motion intensity levels. As another example, the intensity of audio content can be determined based on the loudness of audio in a particular portion of media content. For general facial recognition, intensity can be based on the number of identified faces in a particular portion of a video (e.g., more faces equals higher intensity). For known facial recognition, intensity can be based on the number of identified faces that are known to a user in a particular portion of a video (e.g., friends, family, social networking connections, etc.). In the case of external sensor readings associated with media content (e.g., an accelerometer in a smartphone), intensity can be based on the amount strength of the readings detected by the sensor (e.g., for the accelerometer, stronger movement readings equals higher intensity).

Certain signals are considered "implicit," as they can be automatically identified based on the media content or an associated attribute. Implicit signals can include motion, sound, facial/object recognition, popularity, context, and so on. Other signals are "explicit," in that they can include manually defined elements. For example, a user can manually tag a portion of a video prior to, during, or after recording (e.g., via the UI 200) to indicate that the portion should be considered interesting. In some implementations, while recording audio and/or video, the user manipulates a control (e.g., a button) on a recording device, on the user device 110, or on another external device (e.g., a wirelessly connected ring, wristwatch, pendant, or other wearable device) in communication (e.g., via Bluetooth, Wi-Fi, etc.) with the recording and/or user device 110, to indicate that an interesting portion of the audio/video is beginning. The user can then manipulate the same or a different control a second time to indicate that the interesting portion has ended. The period between the start and end time of the interesting portion can then be considered as having a "user-tagged" signal.

Figure 7:
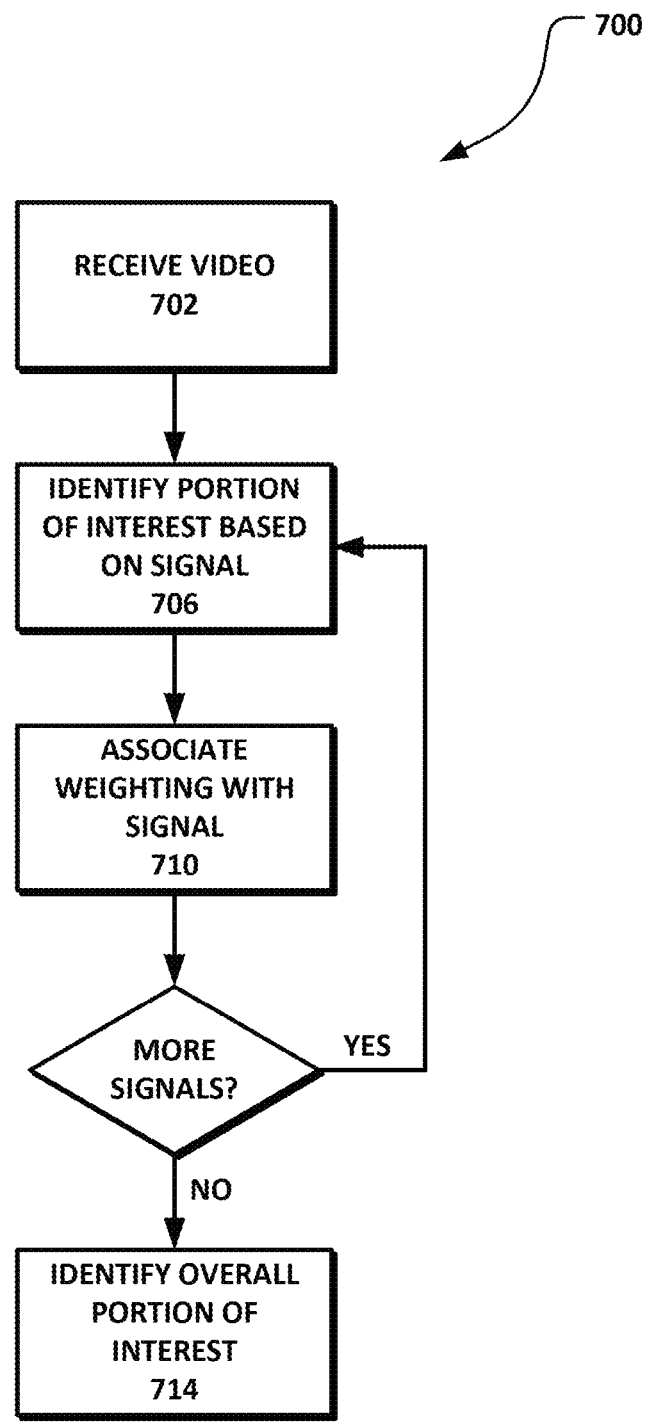
FIG. 7 depicts a flowchart of an example method for weighting a plurality of signals.

FIG. 7 depicts one implementation of a method 700 for identifying a portion of interest of media content. In STEP 702, a video is received (e.g., at user device 110, remote server 120, or other processing device). The video can include one or more signals, such as those signals described above. For at least one of the signals, an intermediate portion of interest in the video is identified based on the respective signal (STEP 706). A particular intermediate portion of interest of the video can be determined based on the intensity of a signal associated with that portion. For example, if a certain portion of the video has an incidence of loud noise relative to the rest of the video, that certain portion can be considered an intermediate portion of interest based on the intensity of the audio signal. In some implementations, intermediate portions of interest can be identified based on the intensity of multiple signals within the respective portions.

In STEP 710, a weighting is associated with at least one of the signals. For example, only motion and facial recognition might be considered important for a particular video, so only those signals are given a non-zero weighting. In another instance, explicit signals are not included in the weighting. The weighting can be personal to a particular user, general based on other users, or a combination of both. More specifically, the weighting can be determined based on historical attributes associated with a media content editor (e.g., the user of the application 115, another individual that is recognized for creating popular media content, or other person or entity) and/or historical attributes associated with a group of users (e.g., users who have created media content with other application instances, users who have expressed interest in media content created by the application user, and/or other group of users whose actions can contribute to a determination of the importance of a particular signal relative to other signals).

For example, if a user creates skydiving videos and frequently indicates that portions containing a high signal intensity for sound are the most interesting to him (e.g., by sharing videos that often contain such high-signal-intensity portions), the system can allocate a higher weighting to the sound signal relative to other signals (e.g., sound is weighted at 60%, while the remainder of the signals make up the remaining 40% weighting). This weighting can be applied to other videos edited by the user and, in some instances, can be combined with weightings based on the preferences of user groups, as indicated above. If combined, individual and group weightings can be weighted equally (e.g., as an initial default weighting), or in other instances, one type can have a greater weight than the other. For example, if there is little or no training data available for a particular individual, the weightings based on user group preferences can be weighted more heavily. In some implementations, signal weighting is also dependent on the context or other attribute(s) associated with particular media content. For instance, if the user prefers high intensity sound signals in his skydiving videos, but prefers high intensity motion signals in his snowboarding videos, the system can weight the signals differently based on whether the user is editing one type of video or the other.

Historical attributes of a content editor and/or group of users can include the following: a propensity of the editor/group to favor media content having a particular signal (e.g., sound is preferred over motion, recognized faces, etc.), a propensity of the editor/group to favor media content lacking a particular signal (e.g., a video without recognized faces is preferred), a propensity of the editor/group to favor media content having a particular signal with a particular signal intensity (e.g., a high intensity of motion is preferred in an action-oriented video), a propensity of the editor/group to disfavor media content having a particular signal (e.g., portions of a video which an ex-girlfriend's face appears are disfavored), a propensity of the editor/group to disfavor media content lacking a particular signal (e.g., video without user-tagged portions is disfavored), and a propensity of the editor/group to disfavor media content having a particular signal with a particular signal intensity (e.g., portions of a concert recording with a low intensity sound signal are disfavored).

The system can refine the weightings it applies to particular signals as data is collected over time relating to user and group preferences of the signals and signal intensities. In some implementations, the weighting process is facilitated or automatically performed using machine learning, pattern recognition, data mining, statistical correlation, support vector machines, Gaussian mixture models, and/or other suitable known techniques. In one example, signal attributes associated with particular weightings can be viewed as vectors in a multi-dimensional space, and the similarity between signal attributes of unweighted signals and signals with particular weightings (e.g., weightings that reflect preferred or otherwise popular media portions by the user and/or other users) can be determined based on a cosine angle between vectors or other suitable method. If the similarity meets a threshold, an unweighted signal can be assigned the weighting of the similar signal vector.

As another example, a classifier (e.g., a suitable algorithm that categorizes new observations) can be trained over time using various historical data, such as the historical attributes referred to above. A classifier can be personal to an individual user, and use training data based only on that user's signal preferences and other data. Other classifiers can be trained based on data associated with the preferences of a group of users. For instance, each time an editor shares media content or otherwise indicates that a portion of the media content is of interest, the signal information associated with the (portion of the) media content (e.g. signal preference, signal intensity preference, etc.) can be stored on the user device 110 and/or transferred to remote server 120 for use as training data to improve future weightings for the editor and/or groups of users. The input to such a classifier (e.g., upon creating new media content or opening a media file) can include signal data, intensity data, media content attribute data, and other information associated with the media content. The classifier can then determine, based on the input and the training data, an appropriate weighting of signals for the media content.

Still referring to FIG. 7, in STEP 714, one or more overall portions of interest of the media content are identified based on the intermediate portion(s) of interest and the signal weighting(s). An overall portion of interest can be identified by combining the signals according to their respective weightings, and selecting a portion of the combined signals (corresponding to a portion of the media content) that meets a threshold signal intensity. Alternatively or in addition, the top or bottom N combined signal intensity points (e.g., top/bottom one, top/bottom three, top/bottom five, top/bottom ten, etc.) can be used to determine the overall points of interest. For example, the top three points (in non-overlapping regions) can be identified, and the segments of the media content that surround each point (e.g., +/−N seconds on either side) can be considered overall portions of interest. To illustrate, when a user creates or opens a video via the application 115, the application 115 can suggest one or more portions of the video that might be of interest to the user (e.g., by a suitable form of visual indication), based on signals in the video and weightings determined based on the user, another user, and/or groups of users. In one implementation, the application 115 presents different signal weightings (and, in some cases, the corresponding portions of interest) to the user (e.g., a weighting based on the user's preferences, a weighting based on an expert's preferences, and/or a weighting based on a group of users' preferences) and allows the user to select which weighting(s) and/or portions of interest the user prefers.

Figure 8:
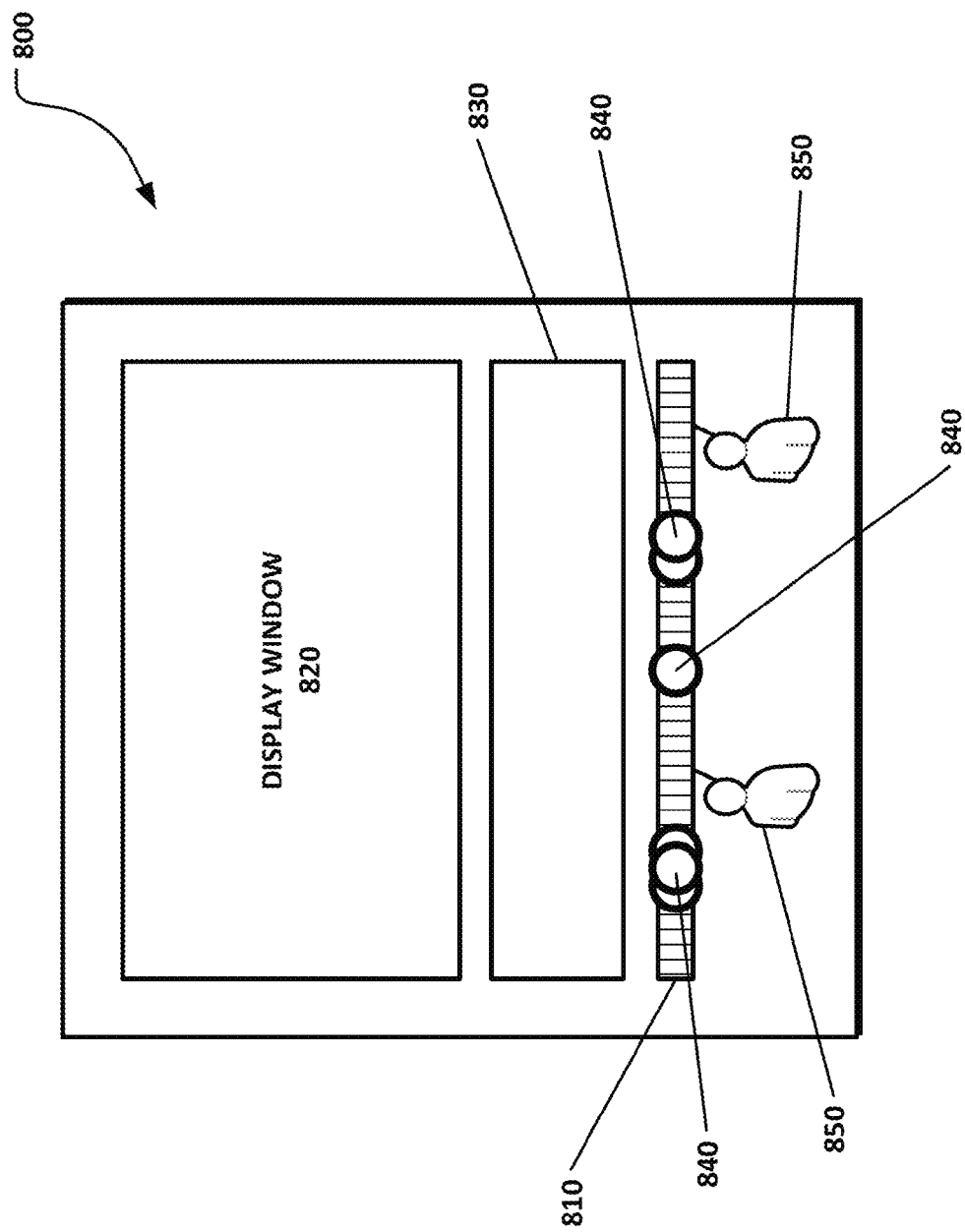
FIG. 8 depicts an example user interface for a video playback system according to an implementation.

FIG. 8 depicts one implementation of a video playback interface 800 (which can be included in application 115) through which users can play media content (e.g., audio, video, etc.) created and/or edited with the application 115 or by other means. Interface 800 includes a visual representation of a timeline 810, which defines different time positions in the media content and can be manipulated by a user to navigate through media content shown in display window 820.

Interface 800 also includes visual representations of signals 830 associated with the media content. The signal representations 830 can be disposed on, above, below, or otherwise proximate to the timeline, and can depict the intensity of one or more of the media content signals as a waveform over the length of the media content. If multiple signals waveforms are displayed, each can be a different color and/or include some other differentiating identifier (e.g., identifying text displayed upon selection or hover). In some implementations, the user can configure the interface 800 to display all signals associated with the media content, no signals, or a subset thereof (e.g., the user can toggle the display of individual signals, implicit signals, explicit signals, and other signal categories). The user can also configure the interface 800 to display the signals separately, display the sum of the signals, and/or display various weighted sums of signals (e.g., a user-based weighting, a group-based weighting, etc.).

Users can express their interest in particular points or portions of media content by "liking" that point or portion while the content is playing in display window 820. In other implementations, users can navigate to a particular portion of the media content using the timeline and "like" the point or portion whether the media is playing, paused, or stopped. A user can actively "like" the media content using, e.g., a button on the interface 800, and/or by other suitable user input actions (e.g., touchscreen gesture, mouse gesture, tracked free-hand gesture, etc.) applied or directed to the display window 820, timeline 810, or other portion of the interface 800. The "like" can be visually represented on the timeline 810 to the user and/or other users viewing the same media content using a suitable graphical and/or textual indicator (e.g., colored shape, icon, pop-up text, combinations thereof, and so on). For example, in the depicted implementation, visual like indicators 840 are disposed at each location on the timeline where a user "liked" the corresponding media content.

Similarly, users can comment on a point or portion of the media content using, e.g., a button on the interface 800 that opens a text box, and/or other suitable user interface control. The user comments can be visually represented on the timeline 810 to the user and/or other users viewing the same media content. For example, in the depicted implementation, visual comment indicators 850 are disposed at each location on the timeline where a user commented on the corresponding media content. The visual comment indicators 850 can include a thumbnail of the user's avatar or profile image (e.g., corresponding to a social networking or other account), and/or can include other suitable graphical and/or textual indicators.

Users can also indicate their interest in the media content or portions thereof in various other manners. For example, a user can select a portion of the media content to share with others through a social network, such as Facebook. A user can also highlight or provide some other visual identification of a portion of interest through the interface 800, and the identification can then be made available to other users, individually or in combination with other indications of interest. In one implementation, a heat map can be used to identify varying levels of interest in portions of the media content.

The presence of likes, comments, recommendations, and/or other indications of social interest over the length of media content can constitute a social signal, which has an intensity that varies in relation to popularity. For example, portions of media content that have a higher concentration of likes, comments, and other indicators of interest relative to other portions of the media content will have a higher social signal intensity. In some implementations, the social signal can be used in further refining signal weightings for the corresponding media content or other media content. In one example, if a video is published in which the motion signal was heavily weighted compared to other signals, but others users, upon viewing the video, prefer portions of the video in which many faces appear (i.e., the social signal has a higher intensity at these face portions), then the social signal may cause future weightings of the media content or other media content to be biased more toward the facial recognition signal. More specifically, social signals can become part of the training data that influences the determination of signal weights.

Ultimately, the interface 800 provides for an overall "signature" that reflects the experience associated with a video (or other form of media content) and that can be quickly apprehended by a user accessing the particular video. The signature can include a visual representation of the implicit and/or explicit signals associated with the video (e.g., separate signals, a weighted combination), such as sound, motion, faces, and the social signal. Thus, from implicit signals, social signals, user labels, and other information associated with the video, a user can easily determine what types of content the video includes as well as what portions are most popular to other users.

In some implementations, multiple videos can be represented that are cotemporaneous on the timeline, for instance, as spatially stacked thumbnails contiguous in the y-axis and/or with edges stacked like a stack of papers to provide either a full representation of multiple points of view of the same event spatially displayed, or the foremost video stream with other points of view selectable by the user. The signature can represent the foremost video or the aggregate signature of all or a subset of the cotemporaneous videos. The set of potential cotemporaneous signals can include large sets of video points of view to represent a single event, such as a baseball game, or a class event, such as all snowboarding on planet Earth at this moment. The same stacking in a different axis (such as the x-axis) can be used to represent jumps in time from the same point of view. For instance, two contiguous pieces of video, two years apart from the same video source such as a home video camera, can be displayed one after the other. The stacking on multiple axes, either spatially contiguous or occluding, can be combined to represent a large number of points of view across a large amount of time, such as all wearable video cameras ever used at a football stadium. The resulting signature can represent either part or all of the videos.

Figure 9:
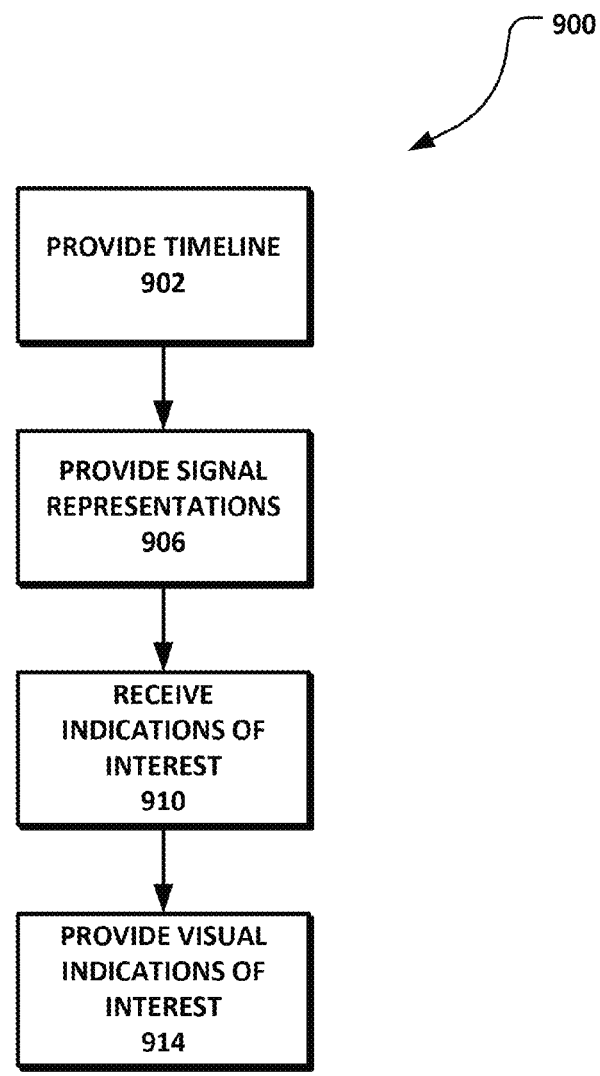
FIG. 9 depicts a flowchart of an example method for providing an experience map for media content.

FIG. 9 depicts an example method 900 for providing an experience map of media content. In STEP 902, a visual representation of a timeline of a video is provided (e.g., by application 115 via interface 800). The timeline includes a plurality of different time positions in the video. Visual representations of one or more signals along the timeline of the video are also provided, as described above (STEP 906). Each signal representation includes an intensity of an identifiable type of content over the time positions. Identifiable types of content can include, for example, motion, sound, presence of faces, recognized faces, recognized objects, recognized activities, and recognized scenes.

From each of a number of users, an indication of interest in a portion of the video is received via interface 800 (STEP 910), and each indication of interest is visually represented on the timeline (STEP 914). The indications of interest can be, for example, comments, likes, share, highlights, and the like, and can be graphically and/or textually represented by the interface 800 as described above.

In some implementations, a social signal is determined based on the indications of interest. The intensity of the social signal over the length of the video can be based on the concentration of the indications of interest over the video length (e.g., more likes for a particular portion relative to other video portions equals a higher intensity social signal for that particular portion). As described above, the social signal can be incorporated into the training data of the system where it can influence determined signal weightings for various media content, in conjunction with social signals for other media content and other historical attributes associated with users and groups of users.

Figure 10:
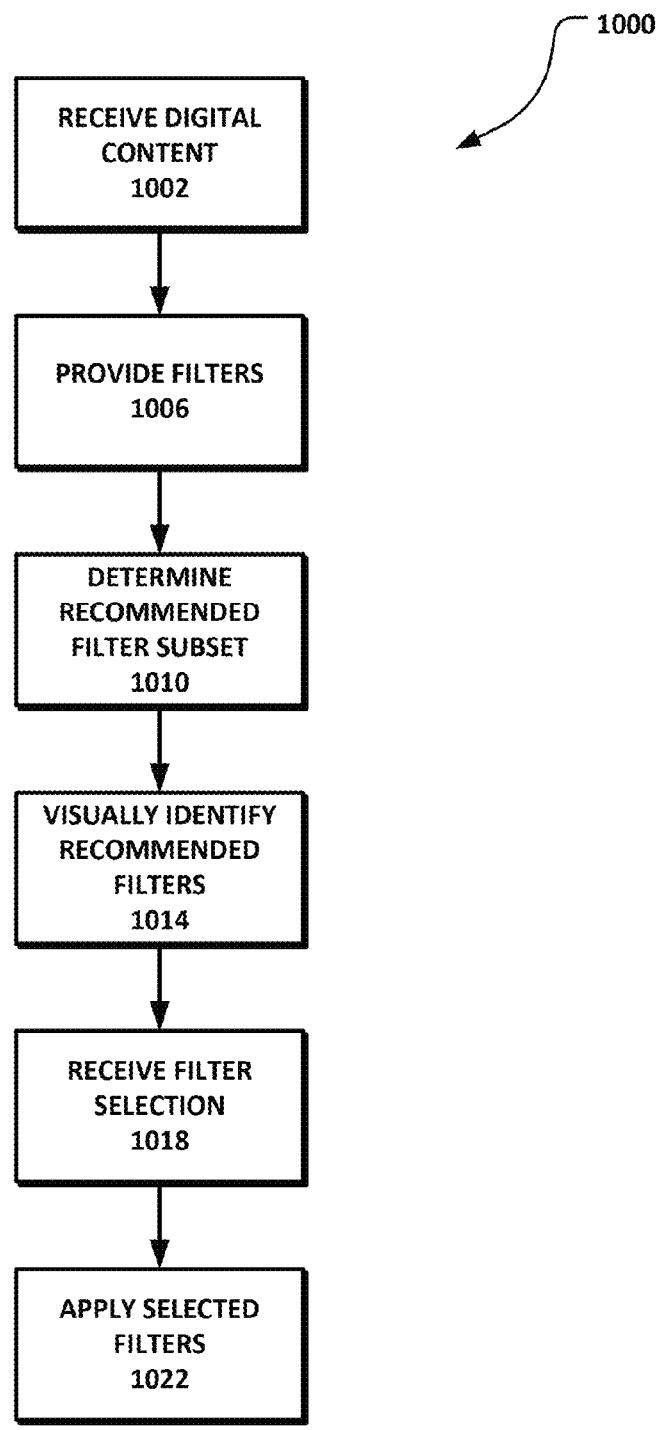
FIG. 10 depicts a flowchart of an example method for recommending a filter for application to media content.
Figure 11:
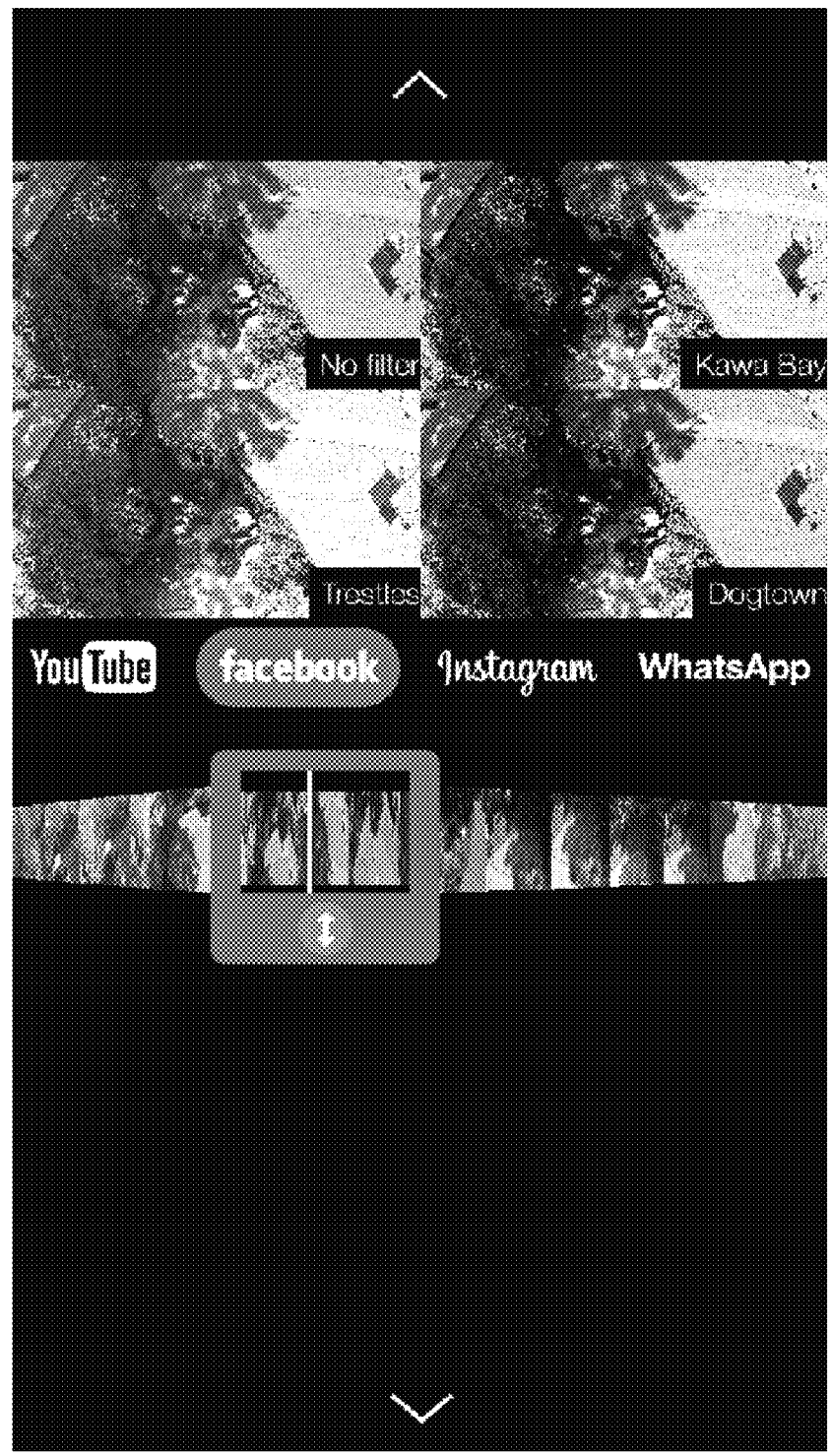
FIGS. 11 and 12 depict example graphical user interfaces for selecting a filter to apply to media content.
Figure 12:
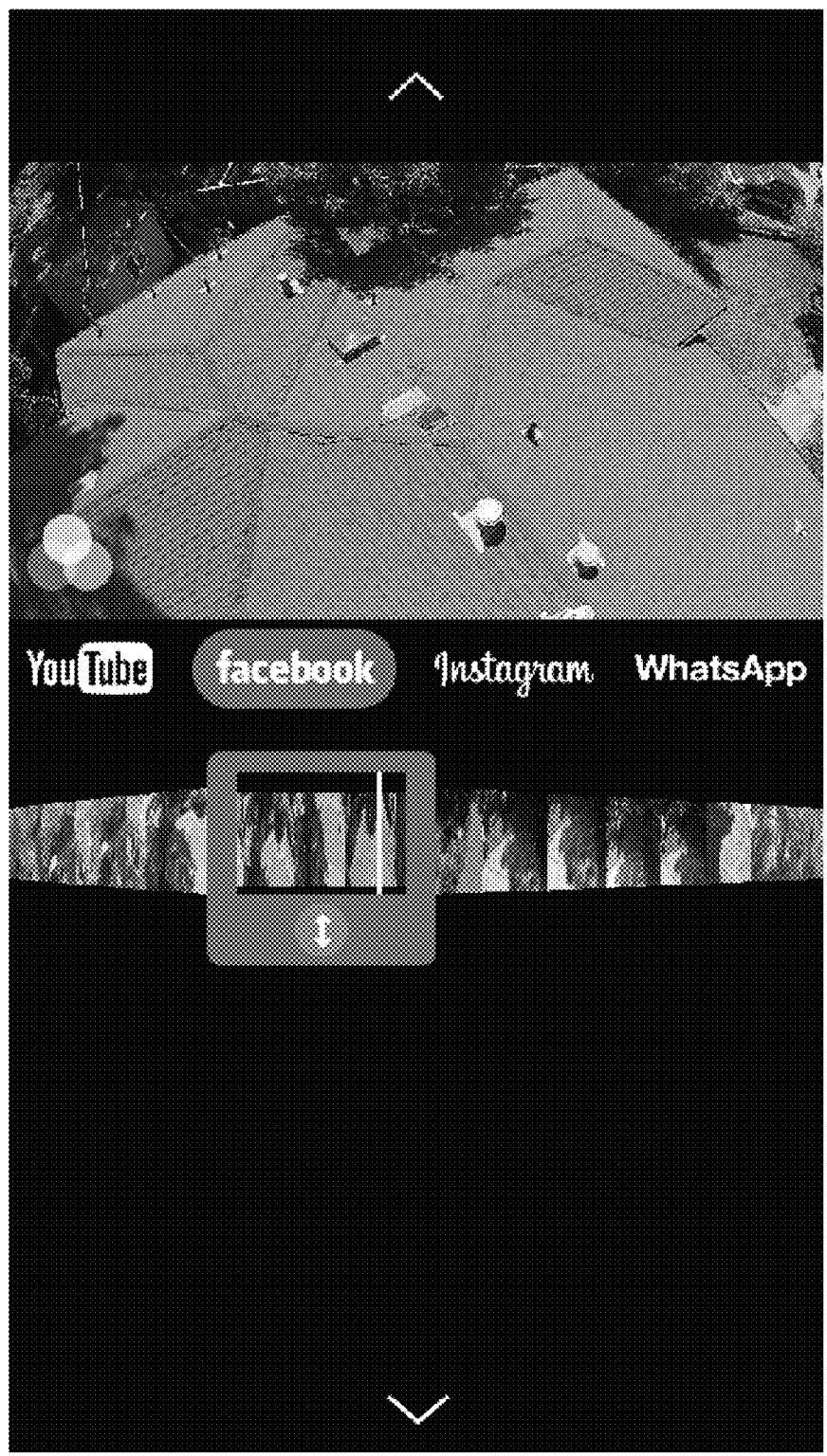

In one implementation, signals and/or other attributes can be used to recommend appropriate filters for application (automatically or by a user) to media content. FIG. 10 illustrates an example method 1000 for providing filter recommendations. In STEP 1002, media content is received on the user device 110. For example, a digital photograph or video can be captured using a camera on the device 110, media content can be downloaded onto the device 110, and so on. The application 115 on the device 110 can provide an interface that allows the user to edit the media content by applying one or more digital filters to the content. A "filter" refers to a modifier of an image or other media content. Filters can provide color enhancement and conversion, changes to brightness and contrast, polarization, diffusion, special effects, and other changes to media content. The application 115 can provide filter functionality based on filters stored on the device 110, custom filters created by the user or other users, and/or filters defined by or retrieved from other sources, such as Instagram. The various available filters can be visually provided to the user for selection via a user interface such as that shown in FIGS. 11 and 12 (STEP 1006).

In STEP 1010, the application 115 determines a subset of the available filters (e.g., 4 to 8 filters) to recommend to the user based on one or more attributes. The attributes can relate to the media content (the entire content or a portion thereof), the user, and/or the mobile device. For example, attributes associated with the media content can include geolocation, location, point of interests, and a signal in the media content (e.g., motion, sound, recognized faces (known or unknown people), recognized objects, recognized activities, and recognized scenes). Attributes can be derived from metadata associated with the media content or by processing the content (e.g., audio, video, imagery) itself.

For instance, to determine the geolocation of the content capturing device (e.g., mobile phone), or the location or nearby points of interest with respect to where the media content was captured, geotag information in the content can be examined. Further, a database or other data structure tracking points of interest (e.g., parks, museums, buildings, geographic features, etc.) can be correlated with the location information to identify which points of interest are located at or nearby the location associated with the media content. Points of interest can be matched directly or semantics in the name of the point of interest (e.g. the word "beach") can be used. In addition, images and video can be processed to recognize particular activities (e.g., snowboarding, skydiving, driving, etc.), particular objects or scenes (e.g., the Empire State Building, the Boston skyline, a snow-covered mountain), weather, lighting conditions, and so on, and audio can be processed to further inform the recognition process (e.g., the sounds of a beach, a crowd, music, etc., can be processed to help identify a location or event).

Attributes used to inform the recommendation of the filters can also include attributes associated with the device that captured the media content (e.g., the user device 110), such as device model, camera type, image sensor resolution, use of flash, white balance, exposure, other camera settings, and so on. This information can be derived, for example, from metadata included in the media content or by examining the capturing device settings and properties during or after capturing media content. Other attributes can include information associated with the device user, the user who captured the media content, or a group of users. For example, the previous behavior and/or preferences of a particular user or a group of users with respect to filter selection can influence what filters are recommended by the application 115. If, for instance, the user, the user's followers, all users, or another identified group select a sepia tone filter for portraits 50% of the time, then that filter can be highly recommended the next time the user captures a portrait-type photograph.

The various machine learning techniques described herein can applied to filter selection. For instance, a classifier can be trained over time using as input attributes (such as those described above) for particular media content in combination with the filter or filters that were selected and applied to the media content. Thus, as an example, the classifier might learn over time that filters that reduce glare and enhance blue tones are often applied to media content that include video or images of activities taking place on snow, such as skiing or snowboarding. As another example, the classifier might learn over time that filters that add warmth and reduce contrast are frequently selected for media content captured near Venice Beach. Accordingly, to determine a recommendation of filters that are likely to be selected by a user from all available filters, one or more attributes can be input to the classifier and the recommendation can be obtained as output. The recommendation can include one or more filters ranked in order of likelihood of selection by the user.

In STEP 1014, the application 115 visually identifies the recommended filters. For example, the application can provide a display of the media content or a portion thereof with a recommended filter applied, accompanied by the name of the filter. In the case of a video, the display can include multiple copies of an image frame from the video arranged on the device screen, each with a different recommended filter applied as a preview (see FIG. 11). The user can then select the desired filter to apply by interacting with the display (e.g., via touch). The user can also manipulate the media content to preview applied filters to other portions of the media content, and then apply one or more filters (recommended or not recommended) to all or a portion of the media content. Accordingly, in STEP 1018, the filter selection is received by the application 115, which applies the selected filter(s) to the designated media content or portion of the media content (STEP 1022).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
   receiving a video comprising a plurality of signals, at least one signal representing an identifiable type of content over a length of the video;
   for at least one of the signals:
     identifying at least one intermediate portion of interest in the video based on the signal, and
     associating a weighting with the signal, wherein the weighting is determined based at least in part on historical attributes associated with at least one of an individual and a group of users, wherein associating a weighting with a particular signal comprises:
       training a classifier to predict whether a given signal weighting would result in identifying a portion of interest in media content using the historical attributes associated with the group of users; and
       providing attributes associated with the particular signal as input to the classifier and obtaining the weighting for the particular signal as output of the classifier; and
   identifying one or more overall portions of interest of the video based on the at least one intermediate portion of interest and the at least one signal weighting.

2. The method of claim 1, wherein the identifiable type of content for a particular signal is selected from the group consisting of motion, sound, presence of faces, recognized faces, recognized objects, recognized activities, and recognized scenes.

3. The method of claim 1, wherein at least one of the signals comprises sensor readings over a length of the video.

4. The method of claim 3, wherein the sensor comprises an accelerometer, a gyroscope, a heart rate sensor, a compass, a light sensor, a GPS, or a motion sensor.

5. The method of claim 1, wherein a particular intermediate portion of interest in the video is identified based on an intensity of the signal.

6. The method of claim 1, wherein identifying a particular overall portion of interest of the video comprises:

combining the signals according to the respective weighting of each signals;
identifying a portion of the combined signals that meets a threshold signal intensity; and
identifying as the particular overall portion of interest a portion of the media content that corresponds to the identified portion of combined signals.

7. The method of claim 1, wherein identifying a particular overall portion of interest of the video comprises:
combining the signals according to the respective weighting of each signals;
identifying a portion of the combined signals that comprises a high or low signal intensity relative to other portions of the combined signals; and
identifying as the particular overall portion of interest a portion of the media content that corresponds to the identified portion of combined signals.

8. The method of claim 1, wherein the individual is an editor of the video.

9. The method of claim 8, wherein a particular historical attribute associated with an editor of the video comprises: a propensity of the editor to favor video content having a particular signal, a propensity of the editor to favor video content lacking a particular signal, a propensity of the editor to favor video content having a particular signal with a particular signal intensity, a propensity of the editor to disfavor video content having a particular signal, a propensity of the editor to disfavor video content lacking a particular signal, or a propensity of the editor to disfavor video content having a particular signal with a particular signal intensity.

10. The method of claim 1, wherein a particular historical attribute associated with the group of users comprises: a propensity of the group of users to favor video content having a particular signal, a propensity of the group of users to favor video content lacking a particular signal, a propensity of the group of users to favor video content having a particular signal with a particular signal intensity, a propensity of the group of users to disfavor video content having a particular signal, a propensity of the group of users to disfavor video content lacking a particular signal, or a propensity of the group of users to disfavor video content having a particular signal with a particular signal intensity.

11. The method of claim 1, further comprising:
for at least one of the signals, associating a second weighting with the signal, wherein the second weighting is determined based at least in part on historical attributes associated with one or more of an editor of the video, a user other than the editor, and a group of users; and
identifying one or more second overall portions of interest of the video based on the at least one intermediate portion of interest and the at least one second signal weighting.

12. The method of claim 1, further comprising:
providing a visual representation of a timeline of the video wherein the timeline comprises a plurality of different time positions in the video; and
indicating the identified overall portions of interest in the visual representation of the timeline.

13. A system comprising:
one or more computers programmed to perform operations comprising:
receiving a video comprising a plurality of signals, at least one signal representing an identifiable type of content over a length of the video;
for at least one of the signals:
identifying at least one intermediate portion of interest in the video based on the signal, and
associating a weighting with the signal, wherein the weighting is determined based at least in part on historical attributes associated with at least one of an individual and a group of users, wherein associating a weighting with a particular signal comprises:
training a classifier to predict whether a given signal weighting would result in identifying a portion of interest in media content using the historical attributes associated with the group of users; and
providing attributes associated with the particular signal as input to the classifier and obtaining the weighting for the particular signal as output of the classifier; and
identifying one or more overall portions of interest of the video based on the at least one intermediate portion of interest and the at least one signal weighting.

14. The system of claim 13, wherein the identifiable type of content for a particular signal is selected from the group consisting of motion, sound, presence of faces, recognized faces, recognized objects, recognized activities, and recognized scenes.

15. The system of claim 13, wherein at least one of the signals comprises sensor readings over a length of the video.

16. The system of claim 15, wherein the sensor comprises an accelerometer, a gyroscope, a heart rate sensor, a compass, a light sensor, a GPS, or a motion sensor.

17. The system of claim 13, wherein a particular intermediate portion of interest in the video is identified based on an intensity of the signal.

18. The system of claim 13, wherein identifying a particular overall portion of interest of the video comprises:
combining the signals according to the respective weighting of each signals;
identifying a portion of the combined signals that meets a threshold signal intensity; and
identifying as the particular overall portion of interest a portion of the media content that corresponds to the identified portion of the combined signals.

19. The system of claim 13, wherein identifying a particular overall portion of interest of the video comprises:
combining the signals according to the respective weighting of each signals;
identifying a portion of the combined signals that comprises a high or low signal intensity relative to other portions of the combined signals; and
identifying as the particular overall portion of interest a portion of the media content that corresponds to the identified portion of the combined signals.

20. The system of claim 13, wherein the individual is an editor of the video.

21. The system of claim 20, wherein a particular historical attribute associated with an editor of the video comprises: a propensity of the editor to favor video content having a particular signal, a propensity of the editor to favor video content lacking a particular signal, a propensity of the editor to favor video content having a particular signal with a particular signal intensity, a propensity of the editor to disfavor video content having a particular signal, a propensity of the editor to disfavor video content lacking a particular signal, or a propensity of the editor to disfavor video content having a particular signal with a particular signal intensity.

22. The system of claim 13, wherein a particular historical attribute associated with the group of users comprises: a propensity of the group of users to favor video content having a particular signal, a propensity of the group of users to favor video content lacking a particular signal, a propensity of the group of users to favor video content having a particular signal with a particular signal intensity, a propensity of the group of users to disfavor video content having a particular signal, a propensity of the group of users to disfavor video content lacking a particular signal, or a propensity of the group of users to disfavor video content having a particular signal with a particular signal intensity.

23. The system of claim 13, further comprising:
for at least one of the signals, associating a second weighting with the signal, wherein the second weighting is determined based at least in part on historical attributes associated with one or more of an editor of the video, a user other than the editor, and a group of users; and
identifying one or more second overall portions of interest of the video based on the at least one intermediate portion of interest and the at least one second signal weighting.

24. The system of claim 13, further comprising:
providing a visual representation of a timeline of the video wherein the timeline comprises a plurality of different time positions in the video; and
indicating the identified overall portions of interest in the visual representation of the timeline.

* * * * *